UNITED STATES PATENT OFFICE.

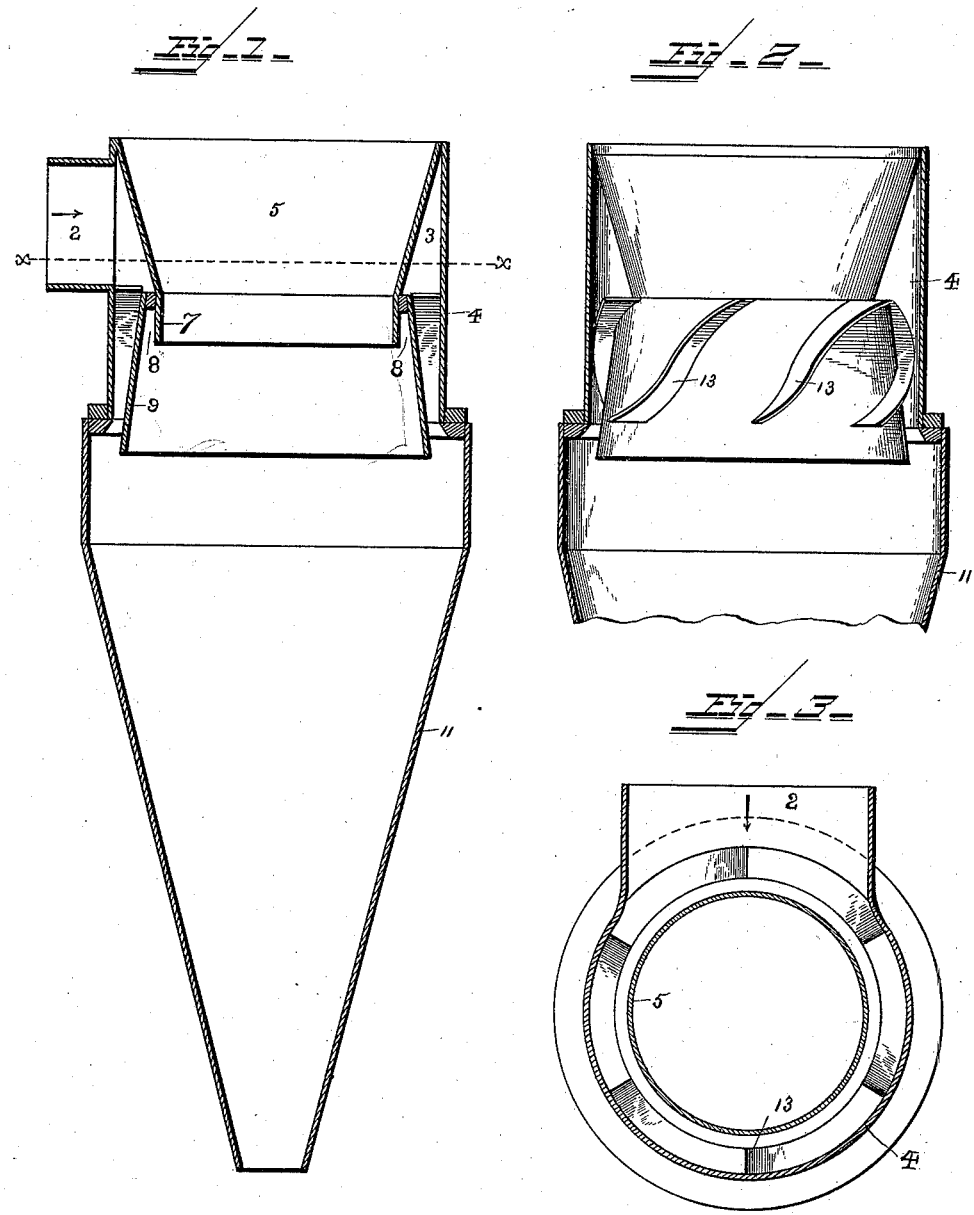

CHARLES M. HARDENBERGH, OF MINNEAPOLIS, MINNESOTA.

DUST-COLLECTOR.

SPECIFICATION forming part of Letters Patent No. 385,263, dated June 26, 1888.

Application filed May 2, 1888. Serial No. 272,550. (No model.)

*To all whom it may concern:*

Be it known that I, CHARLES M. HARDENBERGH, of Minneapolis, in the county of Hennepin and State of Minnesota, have invented certain new and useful Improvements in Dust-Collectors, of which the following is a specification.

This invention relates to improvements in dust-collectors that are designed for use in connection with flour-mill machinery, elevator machinery, wood-working machinery, or in other places where it is desired to separate dust, chaff, shavings, or other light material from a current of air and collect the dust or other material, while permitting the purified air to escape.

The invention consists, generally, in the construction and combination hereinafter described, and particularly pointed out in the claims.

In the accompanying drawings, forming a part of this specification, Figure 1 is a central vertical section of a dust-collector constructed in accordance with my invention. Fig. 2 is a partial sectional elevation of the same. Fig. 3 is a horizontal section on line $x$ $x$ of Fig. 1.

In the drawings, 2 represents an inlet spout or conductor, through which a current of dust-laden air may be driven in the direction indicated in Figs. 1 and 2 by the arrow. This inlet-spout will usually be connected with a blast-fan, by which the dust-laden air will be drawn from the middlings-purifier or other machine or device and forced through suitable pipes or conductors into the inlet-spout 2, and thence into the dust-collector.

The spout 2 is preferably connected directly with an annular expansion-chamber, 3. The inlet-spout is preferably arranged in a radial line with the annular chamber, so that the current of air is free to pass in the inlet-spout in either direction around the annular chamber 3. The outer wall of the annular chamber is preferably formed by a cylindrical casing, 4, which extends, preferably, some distance below the bottom of the annular chamber. The inner wall of the annular chamber is preferably formed by a tube, 5, which is larger at its upper than its lower end and flares outward from the bottom to the top of the chamber. The tube 5 is preferably provided with a cylindrical portion, 7, that extends downward a short distance below the bottom of the chamber.

A tube, 9, which preferably flares outward, extends from the bottom of the annular chamber 3 downward a short distance below the lower edge of the casing 4. The tube 9 is preferably of greater diameter than the lower end of the tube 5, and an annular recess or pocket, 8, is thus formed between the tube 9 and the cylindrical extension 7 of the tube 5. The tube 9 is of less diameter than the casing 4, and an annular space is thus formed between them. This space decreases in area toward its bottom, as shown in Fig. 1, and the lower end of the tube 9 is preferably not less in diameter than the casing 4. The lower end of the casing 4 is connected with the upper end of a circular separating-chamber, 11, which is preferably of conical form, as shown in Fig. 1. The upper end of the separating-chamber may be cylindrical in form, and it is preferably somewhat larger in diameter than the casing 4.

Arranged in the annular space between the casing 4 and the tube 9 is a series of inclined deflectors, 13, which extend from the bottom of the annular chamber 3 to the top of the separating-chamber 11, and form a series of inclined passages from the bottom of the annular chamber 3 into the top of the separating-chamber 11. The inclined deflectors 13 all extend in the same direction and are substantially parallel with each other, and any desired number of them may be used. I have shown here six deflectors, and I find this to be a suitable number to use.

The operation of the device is as follows: The dust-laden air is conducted by any suitable means into the annular chamber 3, where it is preferably slightly expanded. From this chamber it passes down between the deflectors 13 into the top of the separating-chamber 11. As the air-current passes downward between the inclined deflectors 13, it is given an initial whirling motion, which is continued after it enters the separating-chamber. The dust or other light material is thrown against the periphery of the separating-chamber, passes downward over the same, and escapes through a suitable opening at the bottom. The purified air escapes through the tubes 9 and 5 and passes out of the machine. The air as it passes out of the separating-chamber will follow upward near to the inner periphery of the tubes 9 and 5, and if any of the lighter material is carried up by the current of air it will be caught in the pocket 8, and after considerable of it has accumulated in this pocket it will drop back into the separating-chamber.

I am aware that a dust-collector has been made prior to my invention consisting of a separating-chamber constructed with an imperforate peripheral wall, in which the dust-laden air forms a vortex or whirling body, and which is provided in one end with a central discharge-opening for the purified air and at its opposite end with a discharge-opening for the separated dust, and with an external inlet-spout entering the separating-chamber tangentially, and I do not claim this combination. My construction differs from this materially, principally in the use of an annular expansion-chamber having a radially-arranged inlet-spout and connected with the separating-chamber by a series of inclined passages which lead from the bottom of the expansion-chamber into the top of the separating-chamber.

I claim as my invention—

1. A dust-collector comprising an annular expansion-chamber, a separating-chamber arranged below the said expansion-chamber, a series of inclined passages leading from the bottom of said expansion-chamber to the top of said separating-chamber, and a radial inlet-spout connected with said expansion-chamber, substantially as described.

2. The combination, in a dust-collector, of a separating-chamber provided in one end with a discharge-opening for the purified air and at its opposite end with a discharge-opening for the separated dust, an annular chamber arranged over said separating-chamber, a series of inclined passages leading from the bottom of said annular chamber to the top of said separating-chamber, and a radial air-inlet spout connected with said annular chamber, substantially as described.

3. The combination, in a dust-collector, of a circular separating-chamber, a circular casing, 4, connected with the top of said chamber, a tube, 9, arranged within said casing 4, with an annular space between said tube 9 and said casing 4, a series of inclined deflectors, 13, arranged between said tube 9 and casing 4, and dividing said space into a series of inclined passages, all communicating with the top of said separating-chamber, and a radial air-inlet spout communicating with all of said passages, substantially as described.

In testimony whereof I have hereunto set my hand this 28th day of April, 1888.

CHARLES M. HARDENBERGH.

In presence of—
A. C. PAUL,
R. H. SANFORD.